US010970493B1

(12) United States Patent
Lee et al.

(10) Patent No.: US 10,970,493 B1
(45) Date of Patent: Apr. 6, 2021

(54) SYSTEMS AND METHODS FOR SLOT RELATION EXTRACTION FOR MACHINE LEARNING TASK-ORIENTED DIALOGUE SYSTEMS

(71) Applicant: Clinc, Inc., Ann Arbor, MI (US)

(72) Inventors: Andrew Lee, Ann Arbor, MI (US); Zhenguo Chen, Ann Arbor, MI (US); Jonathan K. Kummerfeld, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 17/014,986

(22) Filed: Sep. 8, 2020

Related U.S. Application Data

(60) Provisional application No. 63/028,090, filed on May 21, 2020, provisional application No. 62/990,944,
(Continued)

(51) Int. Cl.
*G06F 40/00* (2020.01)
*G06F 40/35* (2020.01)
(Continued)

(52) U.S. Cl.
CPC ............. *G06F 40/35* (2020.01); *G06N 3/049* (2013.01); *G06N 20/00* (2019.01)

(58) Field of Classification Search
None
See application file for complete search history.

(56) References Cited

U.S. PATENT DOCUMENTS

| 10,885,906 B2 * | 1/2021 | Steedman Henderson ................... G06N 7/005 |
| 2005/0261881 A1 * | 11/2005 | Jackson .................. G06F 30/00 703/1 |

(Continued)

OTHER PUBLICATIONS

Shet, R., Davcheva, E., & Uhle, C. (2019). Segmenting multi-intent queries for spoken language understanding. Studientexte zur Sprachkommunikation: Elektronische Sprachsignalverarbeitung 2019, 141-147. (Year: 2019).*

(Continued)

*Primary Examiner* — Edgar X Guerra-Erazo
(74) *Attorney, Agent, or Firm* — Padowithz Alce; Alce PLLC

(57) ABSTRACT

A system and method for implementing slot-relation extraction for a task-oriented dialogue system that includes implementing dialogue intent classification machine learning models that predict a category of dialogue of a single utterance based on an input of utterance data relating to the single utterance, wherein the category of dialogue informs a selection of slot-filling machine learning models; implementing the slot-filling machine learning models that predict slot classification labels for each of a plurality of slots within the utterance based on the input of the utterance data; implementing a slot relation extraction machine learning model that predicts semantic relationship classifications between two or more distinct slots of tokens of the utterance; and generating a response to the single utterance or performing actions in response to the single utterance based on the semantic relationship classifications between the distinct pairings of the two or more distinct slots of the single utterance.

17 Claims, 4 Drawing Sheets

Related U.S. Application Data filed on Mar. 17, 2020, provisional application No. 62/916,952, filed on Oct. 18, 2019.

(51) Int. Cl.
*G06N 3/04* (2006.01)
*G06N 20/00* (2019.01)

(56) References Cited

U.S. PATENT DOCUMENTS

| | | | |
|---|---|---|---|
| 2018/0052913 A1* | 2/2018 | Gaskill | G06N 5/04 |
| 2018/0196881 A1* | 7/2018 | Lundin | G06N 3/0445 |
| 2019/0012371 A1* | 1/2019 | Campbell | G06F 16/3329 |
| 2019/0130904 A1* | 5/2019 | Homma | G10L 15/26 |
| 2020/0152184 A1* | 5/2020 | Steedman Henderson | G10L 15/197 |

OTHER PUBLICATIONS

Guo, D., Tur, G., Yih, W. T., & Zweig, G. (Dec. 2014). Joint semantic utterance classification and slot filling with recursive neural networks. In 2014 IEEE Spoken Language Technology Workshop (SLT) (pp. 554-559). IEEE. (Year: 2014).*

W. Chao, Y. Ke and W. Xiaofei, "POS Scaling Attention Model for Joint Slot Filling and Intent Classification," 2020 IEEE 20th International Conference on Communication Technology (ICCT), Nanning, China, 2020, pp. 1483-1487 (Year: 2020).*

\* cited by examiner

200

```
IMPLEMENTING UTTERANCE INTENT CLASSIFICATION S210

IMPLEMENTING SLOT-FILLING CLASSIFICATION S220

IMPLEMENTING SLOT RELATION CLASSIFICATION S230
    ENUMERATING PAIRS OF SLOTS S231
    IMPLEMENTING LANGUAGE MODEL LAYER S233
    IMPLEMENTING CONTEXTUAL MODEL LAYER S234
    IMPLEMENTING ATTENTION MODEL LAYER S235
    IMPLEMENTING CLASSIFICATION MODEL LAYER S233
```

FIGURE 2

SYSTEMS AND METHODS FOR SLOT RELATION EXTRACTION FOR MACHINE LEARNING TASK-ORIENTED DIALOGUE SYSTEMS

CROSS-REFERENCE TO RELATED APPLICATIONS

This application claims the benefit of U.S. Provisional Application No. 62/916,952, filed 18 Oct. 2019, U.S. Provisional Application No. 62/990,944, filed 17 Mar. 2020, and U.S. Provisional Application No. 63/028,090, filed 21 May 2020, which are incorporated herein their entireties by this reference.

GOVERNMENT RIGHTS

The subject matter of the invention may be subject to U.S. Government Rights under National Science Foundation grants: NSF SBIR Phase 1 Grant-1622049 and NSF SBIR Phase 2 Grant-1738441.

TECHNICAL FIELD

The inventions herein relate generally to the machine learning and artificially intelligent dialogue systems fields, and more specifically to new and useful systems and methods for intelligently implementing machine learning models of a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in training the underlying machine learning models performing classification and predictive functions of the artificially intelligent conversation systems.

Therefore, there is a need in the machine learning field for systems and methods that enable rapid and efficient training of machine learning models and for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

BRIEF SUMMARY OF THE INVENTION(S)

In one embodiment, a system for implementing slot-relation extraction in a task-oriented dialogue system includes: a natural language understanding (NLU) module implemented by one or more computers of a task-oriented dialogue system, the NLU module comprising: (i) an intent classification sub-module comprising one or more dialogue intent classification machine learning models that predict an intent category of dialogue of a single utterance based on an input of utterance data, wherein the category of dialogue informs a selection of one or more slot-filling machine learning models; (ii) a slot-filling sub-module comprising the one or more slot-filling machine learning models that predict one or more slot classification labels for each of a plurality of slots within the single utterance; and (iii) a slot relation extraction sub-module comprising a slot relation extraction machine learning model that predicts one or more semantic relationship classifications between distinct pairings of two or more distinct slots of the single utterance based on an input of the intent category of dialogue prediction and the one or more slot classification label predictions for each of the plurality of slots within the single utterance; wherein the NLU module identifies one or more semantic relationships between the distinct pairings of the two or more distinct slots of the single utterance based on the one or more semantic relationship classification predictions of the slot relation extraction machine learning model; and a response generator that constructs a response to the single utterance or performs one or more actions in response to the single utterance based on the one or more semantic relationships between the distinct pairings of the two or more distinct slots of the single utterance.

In one embodiment, the intent classification sub-module, the slot-filling sub-module, and the slot relation extraction sub-module together define an utterance processing pipeline stage of the NLU model; and the slot filling sub-module is arranged operably downstream, within the utterance processing pipeline stage, of the intent classification sub-module and the slot-filling sub-module.

In one embodiment, the prediction of the semantic relationship between the distinct pairings of the two or more distinct slots of the single utterance is explicitly predicated on the prediction of the one or more slot classification labels for each of a plurality of slots within the single utterance from the slot-filling sub-module that is arranged upstream of the slot relation extraction module.

In one embodiment, the one or more slot-filling machine learning models comprise one or more light weight slot-filling machine learning models that predict the one or more slot classification labels that inform semantic meaning data of each of the plurality of slots of the single utterance without informing contextual meaning data of each of the plurality of slots of the single utterance.

In one embodiment, the method includes a training corpus module that constructs a training corpus including a plurality of distinct conversational utterance training data samples having slot-wise relation annotations and slot classification annotations, wherein the slot-wise relation annotations identify a distinct semantic relationship between each pair of slots in the plurality of distinct conversational utterance training data samples.

In one embodiment, the method includes a training module that trains the slot relation extraction machine learning model using the training corpus comprising the plurality of distinct conversational utterance training data samples having slot-wise relation annotations and slot classification annotations.

In one embodiment, the response generator compiles into NLU data: (a) the intent category of dialogue; (b) the one or more slot classification labels; and (c) the semantic relationship classification between distinct pairings of two or more distinct slots of the single utterance; the response generator further constructs the response to the single utterance or performs the one or more actions in response to the single utterance based on the NLU data.

In one embodiment, a method for implementing slot-relation extraction for a task-oriented dialogue system includes: implementing one or more dialogue intent classification machine learning models that predict a category of dialogue of a single utterance based on an input of utterance data relating to the single utterance, wherein the category of dialogue informs a selection of one or more slot-filling machine learning models; implementing the one or more slot-filling machine learning models that predict one or more slot classification labels for each of a plurality of slots within the utterance based on the input of the utterance data; implementing a slot relation extraction machine learning model that predicts one or more semantic relationship classifications between two or more distinct slots of tokens of the utterance; and generating a response to the single utterance or performing one or more actions in response to the single utterance based on the one or more semantic relationship classifications between the distinct pairings of the two or more distinct slots of the single utterance.

In one embodiment, implementing the slot relation extraction machine learning model includes: identifying all possible pairs of distinct slots based on the plurality of slots of the single utterance; for each pair of distinct slots, predicting a slot relationship; and annotating each of the pair of distinct slots based on the predicted slot relationship.

In one embodiment, implementing the slot relation extraction machine learning model is performed synchronously after predictive outputs of the one or more dialogue intent classification machine learning models and the one or more slot-filling machine learning models.

In one embodiment, implementing the slot relation extraction machine learning model includes: (i) receiving an input of the prediction of the category of dialogue; (ii) receiving an input of the prediction of the one or more slot classification labels; and (iii) generating the prediction of the one or more slot relationship classifications for the single utterance based on the prediction of the category of dialogue and the one or more slot classification labels.

In one embodiment, the method includes constructing a training corpus including a plurality of distinct conversational utterance training data samples having slot-wise relation annotations and slot classification annotations, wherein the slot-wise relation annotations identify a distinct semantic relationship between each pair of slots in the plurality of distinct conversational utterance training data samples.

In one embodiment, the method includes training the slot relation extraction machine learning model using the training corpus comprising the plurality of distinct conversational utterance training data samples having slot-wise relation annotations and slot classification annotations.

In one embodiment, the one or more slot-filling machine learning models comprise one or more light weight slot-filling machine learning models that predict the one or more slot classification labels that inform semantic meaning data of each of the plurality of slots of the single utterance without informing contextual meaning data of each of the plurality of slots of the single utterance.

In one embodiment, the method includes invoking the slot relation extraction module based on the prediction of the category of dialogue, wherein the invoking includes: referencing a mapping that maps each of a plurality of distinct categories of dialogue to one of a plurality of distinct slot relation extraction machine learning models; and selecting the slot relation extraction machine learning model that is mapped to the predicted category of dialogue based on the referencing to the mapping.

In one embodiment, the slot relation extraction machine learning model comprises a slot relation neural network, wherein a structure of the slot relation neural network includes: (a) an embeddings layer, (b) one or more intermediate layers comprising Bi-LSTMs, (c) a near-terminal layer comprising an attention layer, and (d) a classification layer.

In one embodiment, the utterance data of the single utterance propagates sequentially along the structure of the slot relation neural network by first entering the embeddings layer and propagating through one or more intermediate layers then through the near-terminal layer, and exiting the classification layer with the one or more semantic relationship classifications.

BRIEF DESCRIPTION OF THE FIGURES

FIG. 2 illustrates an example method in accordance with one or more embodiments of the present application.

DESCRIPTION OF THE PREFERRED EMBODIMENTS

Figure 1:
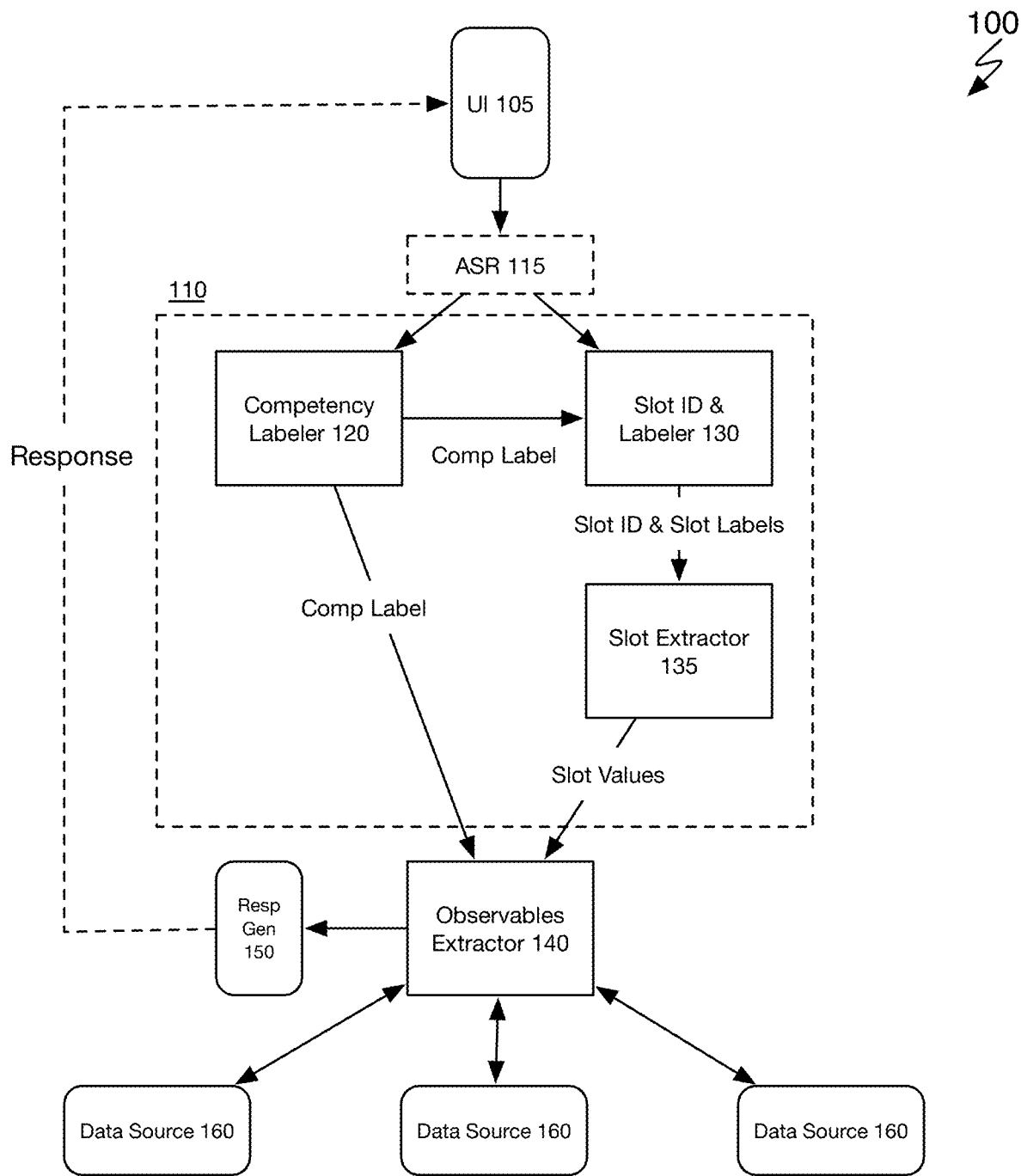
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly defined intents. This inflexible structure cannot reasonably and efficiently address the many variances in the manners in which a user may pose a query or command to the virtual assistant.

The embodiments of the present application, however, provide an artificially intelligent machine learning-based dialogue service and/or system with natural language processing capabilities that function to process and comprehend structured and/or unstructured natural language input from a user or input from any other suitable source and correspondingly provide highly conversant responses to dialogue inputs to the system. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, systems and methods are provided that enable an intelligent curation of training data for machine learning models that enable a rapid and efficient training of machine learning models employed in a machine learning-based dialogue system.

Slot Relation Extraction Overview

Task-oriented dialogue systems may generally combine intent classification models with slot-filling models as part of their natural language understanding (NLU) module. While intent classification and slot-filling may be able to handle a wide range of queries, they do not always provide enough information to handle more complex queries that contain relationships between slots. Relation Extraction (RE) is the process of extracting and classifying semantic information about relationships between two or more items, typically segments of text. RE models have been to derive structured information from vast amounts of unstructured text data for various purposes, however the source of the text data tasks has mainly come from news articles, encyclopedia entries, or blog posts. In one or more embodiments of the present application, systems and methods for applying Relation Extraction models to task-oriented dialogue applications are described. In some embodiments, the method includes a novel method for annotating and/or labeling training sample data. In such embodiments, the method can be used to uncover intelligent insights on (NLU) datasets and may improve the quality and generalizability of task-driven dialogue systems.

1. System for a Machine Learning-Based Dialogue System

As shown in FIG. 1, a system 100 that implements an artificially intelligent virtual assistant includes an artificial intelligence (AI) virtual assistant platform 110 that includes a competency classification engine 120, a slot identification engine 130, a slot value extractor 135, an observables extractor 140, an artificial intelligence virtual assistant response generator 150, and data sources 160. The system 100 may additionally include an automatic speech recognition unit 115 and a user interface system 105.

Figure 1A:
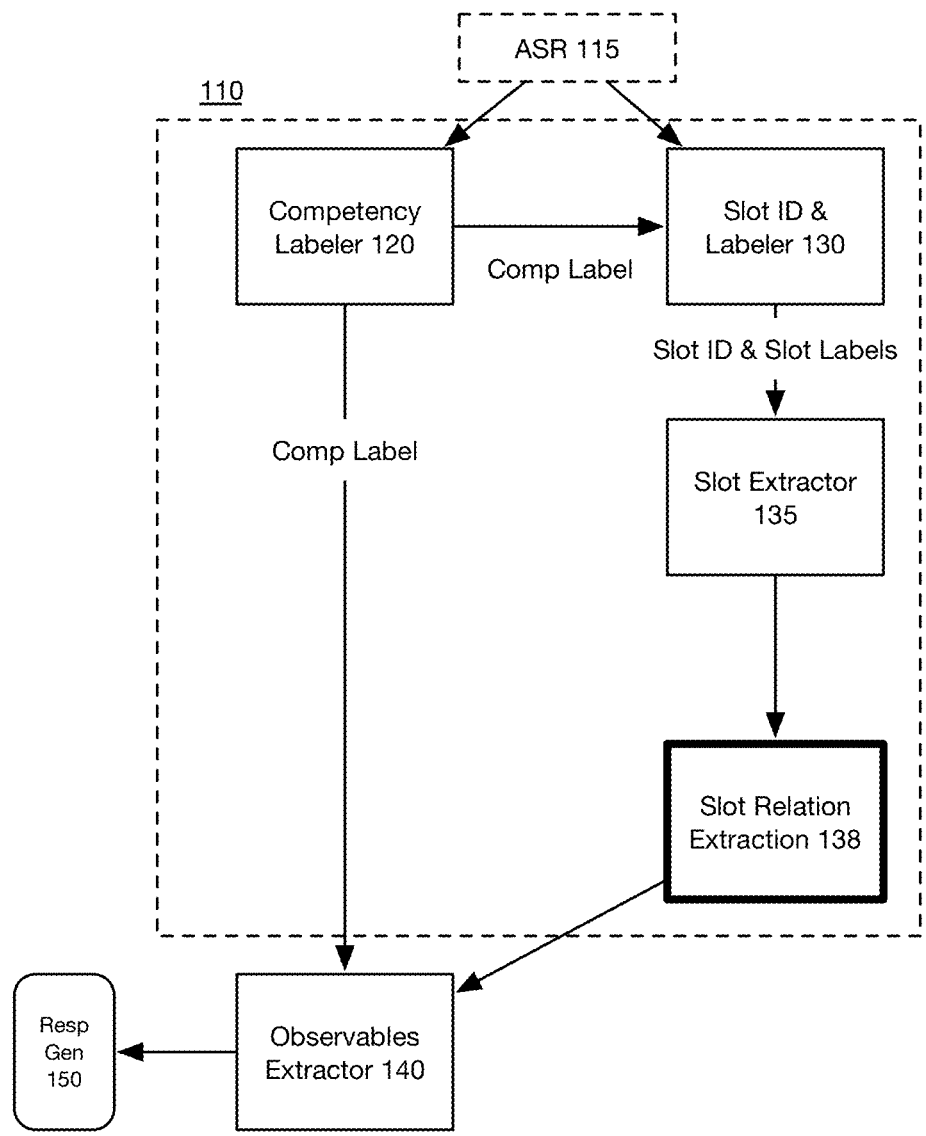
FIG. 1A illustrates a schematic representation of a variant of system 100 that includes slot relation capabilities in accordance with one or more embodiments of the present application.

Additionally, as shown in FIG. 1A, a variant schematic of the system 100 includes a slot relation extraction module 138. In one or more embodiments, a variant of the system 100 may integrate a slot relation extraction module 138 after the competency classification (module) engine 120 and slot identification and classification (module) engine 130. In such configuration, the slot relation extraction module 138 may function to ingest predictions and/or learnings from the engine 120 and the engine 130, as input, and further function to compute relation predictions in an utterance. Accordingly, once the slot relation extraction module 138 produces relation predictions among slots of a given utterance, slot predictions and relation prediction may be forwarded to one or more back-end applications (e.g., observable extractor 140, response generator 150, etc.).

In one or more embodiments, the competency classification engine 120, the slot classification and identification engine 130 together with the slot relation extraction module 138 may define one or more sub-components of a natural language understanding module (not shown). In such embodiments, each of the engine 120, the engine 130, and the slot relation extraction module 138 may be arranged along a natural language processing pipeline stage in which the slot relation extraction module 138 is arranged downstream of the engine 120 and the engine 130. In some embodiments, only after receiving the predictive outputs of the upstream modules does the slot relation extraction module execute on utterance data to predict slot relation data and/or slot relation annotations. Thus, in such embodiments, the predictions of the slot relation extraction module 138 may be predicated on one or more of the predictive outputs of the engine 120 and the engine 130. In use, in some embodiments, an implementation of the natural language understanding module may be synchronous such that the predictive outputs of the natural language understanding module propagates synchronously along the pipeline stage.

Additionally, or alternatively, in one or more embodiments, the slot relation extraction module 138 comprises or implements one or more slot relation extraction machine learning models. In a preferred implementation, the one or more slot relation extraction machine learning models include lightweight slot relation extraction machine learning models that may function to only extract and/or predict semantic relationship data between multiple slots and exclude predictions on semantic contextual data. That is, a structure of the lightweight slot relation extraction machine learning models may be modified and in some cases, reduced in a manner that focuses the predictive tasks of the model only on classifying slot relationships.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. No. 15/797,414 and U.S. patent application Ser. No. 15/821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform no functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform no may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform no. Thus, the AI virtual assistant platform no may work in conjunction with the service provider to attend to the one or more queries and/or commands of the users of the service provider. In this implementation, the data sources 160 may be data sources of the service provider that are external data sources to the AI virtual assistant platform no.

The competency classification engine 120 together with the slot identification engine 130 and the slot value extractor 135 preferably function to define a natural language processing (NLP) component of the artificial intelligence platform no. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform no.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Implementing Relation Extraction Methods for Dialogue Systems

FIG. 2 shows an exemplary method 200 for implementing relation extraction methods for task-oriented dialogue systems. The method 200, in some embodiments, includes determining, identifying, or classifying the dialogue intent or domain (e.g., dialogue competency) of a query or utterance S210, performing slot-filling or entity recognition models to identify relevant entities in a query S220, and performing a relation extraction step S230. Optionally, the method 200 may include enumerating pairs of slot segments S231.

In one or more embodiments of the present application, the method 200 preferably enables a natural language understanding (NLU) module to more robustly and generalizability parse and/or understand text or speech inputs or queries containing multiple slots with semantic relations, by more accurately capturing actionable semantic information. For example, the sentence "Give me three large burgers and two fries" relations between slots (specifically between multiple food items and associated sizes and quantities). The output of classification and slot-filling models may not be sufficient to correctly handle such queries, and without incorporating a relational extraction model step, dialogue systems may require additional rules written into the back-end application to capture and process relations between slots. Implementation of such rules may not be optimal, as they may reduce the generality with which the systems may be used, and may introduce unforeseen errors, resulting in a brittle system.

Additionally, or alternatively, the method 200 may also function to enable more scalable deployments of NLU systems with improvements in data annotation and/or labeling schemes that may function to capture and describe relations between slots in a training data corpus or corpora. Additionally, such an annotation method may function to enable a simplified slot-filling model in which contextual meaning on a per-slot basis may be eliminated, enabling the representation of queries as logical expressions and facilitating more generalizable and scalable NLU system development.

2.1 Dialogue Intent Classification

S210, which includes classifying the intent of utterance or query data, may function to determine or identify the scope, domain, class, and/or category of dialogue that appropriately describes query or utterance data, to appropriately classify the type of algorithm or approach that may be best suited to answering or responding to the query.

In one or more embodiments, in response to receiving utterance data into a machine learning-based dialogue system (e.g., system 100), S210 may function to predict one or more competency classifications (labels) or one or more dialogue intent classifications (labels) that may probabilistically indicate a category or domain of dialogue intended by a user producing the utterance data, as described in more detail in U.S. patent application Ser. Nos. 15/797,414 and 16/682,081, which are incorporated herein in their entireties by this reference.

In one or more embodiments, performing the dialogue intent classification task may include implementing one or more trained machine learning models that may be specifically trained to predict or output one or more of a plurality of predetermined classification and/or competency labels of a machine learning-based dialogue system based on utterance data. In some embodiments, the one or more trained machine learning models may be implemented using one or more deep machine learning algorithms and/or using any suitable learning algorithms.

2.2 Slot Filling Task

S220, which includes performing one or more slot-filling operations on a given query, may function to parse the query or utterance in order to identify slots, identify appropriate labels for such slots, and fill and/or annotate each identified slot with appropriate labels, as described in more detail in U.S. Pat. No. 10,572,801.

In one or more embodiments, S220 may function to perform slot value identification of given utterance data that includes identifying details in a query or a command to a machine learning-based dialogue system that enables the system to service the query or the command. In slot value identification, S220 may function to segment or parse the query or command to identify operative terms that may function cause an execution of one or more actions or operations by the system required for servicing and providing a response to the query or command.

Accordingly, S220 may initially function to decompose an utterance into intelligent (slot) segments, predict one or more slot classification labels, annotate each slot with a respective slot classification, and perform one or more operations for responding to the utterance based on the slot data (i.e., slot classification labels, etc.).

2.3 Relation Extraction Task

S230 invokes one or more of a plurality of distinct slot relation models based on one or both of an utterance intent classification label (S210) and slot-filling values/labels (S220) for a given utterance. In a preferred embodiment, the machine learning-based dialogue system implementing the method 200 may include one distinct slot extraction model per dialogue intent (i.e., dialogue category, dialogue competency, etc.). Accordingly, in one or more embodiments, the one or more predictions and/or labels produced in upstream utterance classification tasks for a given utterance may govern or define which of a plurality of distinct slot relation models that may be invoked for predicting relationships in the given utterance.

In one or more embodiments, to invoke a proper slot relation model, S230 may function to reference a mapping of each of a plurality of distinct competencies or categories of dialogue of a machine learning-based dialogue system to one of a plurality of distinct slot relation models. In such embodiment, the mapping may be a coarse mapping in which the mapping may be based solely on links between dialogue competency labels and slot relation models.

In an additional or alternative embodiment, when invoking a proper slot relation model, S230 may function to reference a granular and/or hierarchical mapping of distinct competencies of dialogue together with slot classification labels to one of a plurality of distinct slot relation models. In such embodiment, S230 may function to identify a subset of slot relation models from a plurality of distinct slot relation models and function to identify or select one slot relation model from the subset of slot relation models based on one or more slot classification labels of a given utterance. Accordingly, while S230 may function to use a competency classification label of a given utterance to identify a top-level or broad category of slot relation models for evaluating the given utterance, S230 may function to subsequently use slot classification labels of he given utterance to identify a tailored slot relation model best suited for identifying relations between slot segments of the given utterance.

2.3.1 Slot Pairwise

In one or more embodiments, a single utterance may include multiple slot segments. In such embodiments, S230 may optionally or additionally include S231, which includes identifying one or more slot segment pairings for a given utterance. That is, in some embodiments, a given utterance may include two or more distinct slot segments. Accordingly, S230 includes S231 which may function to enumerate all possible pairs of slot segments in a subject utterance; each slot segment pairing of the utterance may be treated as an independent relation extraction task.

In such embodiments, S231 may function to create or identify distinct slot segment pairings within a given utterance. For instance, in a subject utterance having three slot segments, S231 may function to create or identify up to three distinct slot segment pairings.

In one or more embodiments, S231 may function to duplicate the subject utterance and emphasize or otherwise, annotate only one distinct slot segment pairing for evaluation by a selected slot relation model. In other words, an input to a selected slot relation model may include a subject utterance having a distinct slot segment pairing that may be a primary subject of a slot relation classification task. In one example, S235 may function to annotate the slot pairings by identifying a beginning and an ending of each of the distinct slot segments of a given slot segment pairing.

2.3.2 Relation Extraction with Neural Networks

In one or more embodiments, S230 may function to implement a relation extraction machine learning model (sometimes referred to herein as a "relation extraction model") to identify and/or classify semantic relations between slot segments of an utterance. In a preferred embodiment, S230 may function to compute or predict whether two or more slot segments of an utterance have a recognized or emerging relation and further, augment the two or more slot segments with slot-wise relation annotations that identifies and/or characterizes a type of relation between the two or more slot segments of the utterance.

In a first implementation, a relation extraction model may include a single machine learning model, such as a single (slot relation) neural network, having an architecture or structure that includes multiple distinct layers including, at least, an initial layer, one or more intermediate layers, a near-terminal layer and a terminal layer or one or more layers subsequent to the intermediate layers. As one example, a structure of the relation extraction model may include an initial embedding layer, one or more intermediate Bi-LSTM layers, and a near-terminal layer comprising an attention layer. It shall be noted that a structure or composition of the relation extraction model should not be limited to such example, as the relation extraction model may include any number or additional layers including one or more initial layers, one or more intermediate layers, and/or one or more near-terminal layers (i.e., one or more layers immediately before the terminal layer) prior to building a prediction or prior to a classification layer. As such, when a composition of the relation extraction model includes these exemplary layers, an utterance input may propagate along the neural network sequentially, such that utterance data travels first to an initial or first layer and is processed and subsequently to the one or more intermediate layers and lastly to the one or more terminal layers of the relation extraction model. Additionally, or alternatively, in some embodiments, an output of an upstream layer of a relation extraction model may be passed as input into a downstream layer of the relation extraction model.

Additionally, or alternatively, in a second implementation, a structure of the relation extraction model may be defined by a composition of multiple distinct machine learning models. Thus, in one or more embodiments, the relation extraction model comprises an ensemble of machine learning models whose structure or composition may include, at least, one or more embedding machine learning models, one or more Bi-LSTM machine learning models, one or more attention layers, and/or any suitable machine learning model. In such embodiment, an utterance input being handled by the relation extraction model may be processed in any suitable manner including, but not limited to, a processing of utterance data asynchronously and/or in parallel by each of the distinct models defining the relation extraction ensemble.

2.3.3 Embedding Layer|Vectorization

In one or more embodiments, a slot extraction model may include one or more language models layers, such one or more embedding layers comprising word embedding models and/or sentence embedding models. In such embodiments, S230 includes S233 which may function to implement the one or more language model layers to encode, categorize, or otherwise group words, tokens, or sequences of words or tokens (e.g., phrases or sentences) having similar meanings such that that they have a similar representation.

In a preferred embodiment, a first layer or an early layer of a slot extraction model comprises the one or more embedding models or algorithms. Accordingly, in such preferred embodiment, utterance data, including a query utterance or the like, may be provided as input to a first embedding layer at which S233 may function to compute for or map each token or slot segment of the utterance data to a word representation, such as vectors of real numbers or the like.

Additionally, or alternatively, S233 may function to compute an independent word or sentence representation for each token and/or slot segment of an utterance and individually pass each word or sentence representation as input into a downstream layer (e.g., a bidirectional LSTM layer or the like) of a slot extraction model.

S2.3.4 Contextual Semantic Layer

Additionally, or alternatively, in one or more embodiments, the slot relation extraction model may include an intermediate layer that S230 which includes S234 may function to implement to identify or compute contextual semantic data for a given utterance. In a preferred embodiment, the intermediate layer of the slot relation extraction model includes a bidirectional LSTM model that may function compute and/or identify semantic contextual data relating to each slot and/or between slot segments of an utterance. In a preferred embodiment, S234 may function to identify dependencies between slots and compute one or more context vectors for each of the slot segments of an utterance and/or summary context vector for an entirety of the utterance.

In one or more embodiments, one or more outputs of a first layer or an upstream layer (e.g., an embedding layer, etc.) of the slot relation extraction model may be passed as input into the intermediate layer. In one implementation, input into the intermediate layer may include a plurality of distinct word or sentence representations for each of a plurality of distinct slot segments of an utterance. In this implementation, S230 may function to include slot pairings data together with the plurality of distinct word or sentence representations. In such implementation, the slot pairings data may function to identify which of two slot segments of an utterance for which contextual semantic data (or relation data) may be required and/or define a focus of the intermediate layer.

Figure 3:
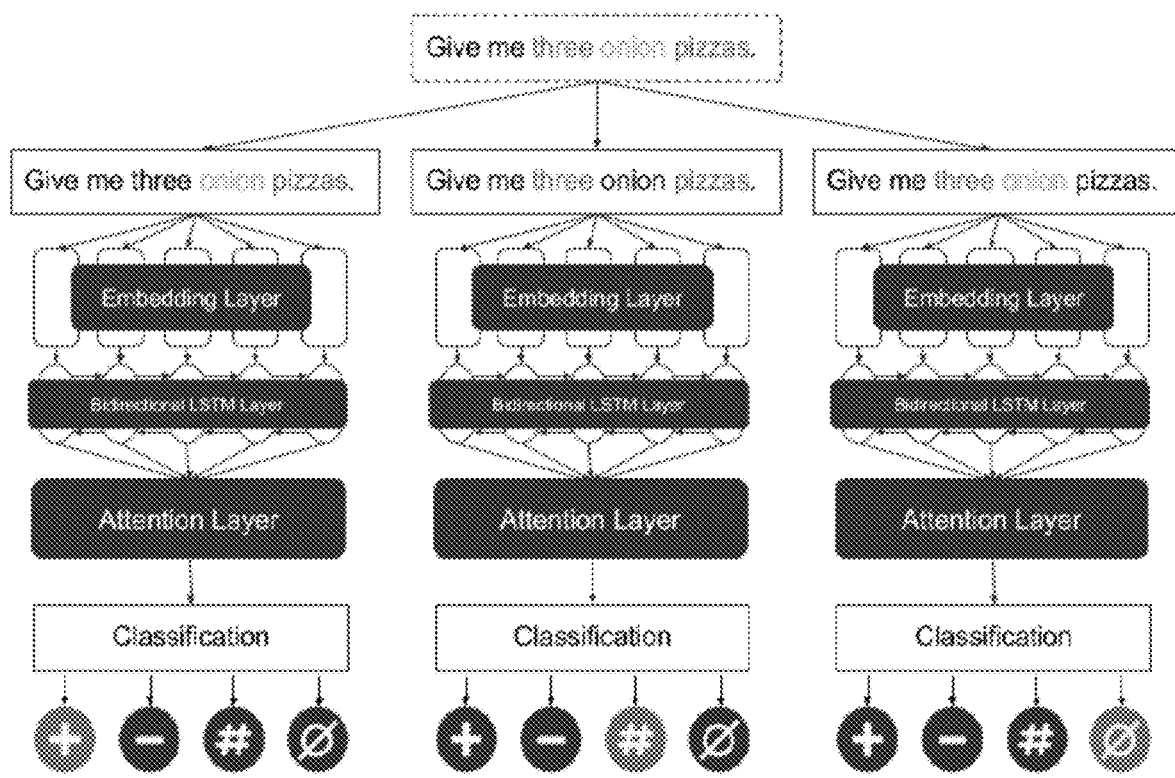
FIG. 3 illustrates a schematic representation of a slot relation neural network in accordance with one or more embodiments of the present application.

It shall be noted that, in the case that an utterance includes multiple possible slot segment pairings, S234 may function to implement multiple instances of slot relation extraction model with each distinct instance having an input of the same utterance but having distinct slot segment pairings defining a focus for slot relation data, as shown by way of example in FIG. 3. That is, a computational output of the intermediate layer of the slot relation extraction model should preferably include contextual semantic data that may be used to inform one or more relations between the slot segments within the defined slot pairing.

2.3.5 Attention Layer

Additionally, or alternatively, in one or more embodiments, the slot relation extraction model may include a further intermediate or near-terminal layer that S230 which includes S235 may function to implement to identify or predict relative importance of slot segments and/or tokens of an utterance to one another. In a preferred embodiment, the near-terminal layer of the slot relation extraction model includes an attention model or an attention mechanism that may function to identify or determine which slots and/or tokens are more or less important to one another in a given utterance.

In a preferred embodiment, an attention layer of a slot relation extraction model may function to collect, as input, from an upstream layer (e.g., BiLSTM layer) of the slot relation extraction contextual semantic data that may function to identify a potential relationship between at one slot pairing of two distinct segments within a given utterance. In such embodiment, the attention layer may function to compute one or more vectors of weights for each distinct slot segment and/or slot token of a given utterance indicating a relative importance of each distinct slot segment or token to one another. Preferably, S230 computes one or more distinct vectors of weights for a designated slot segment pairing of the given utterance that preferably identifies a relative importance of a first entity within the slot pairing to the second entity and a relative importance of the second entity within the slot pairing to the first entity.

Additionally, or alternatively, the near-terminal layer may use any suitable algorithm to implement the attention mechanism.

2.3.6 Classification Layer

Additionally, or alternatively, in one or more embodiments, the slot relation extraction model may include a terminal layer (i.e., a classification layer) that S230 which includes S236 may function to implement predict one or more classification labels identifying a relationship between two or more distinct slot segments of a given utterance.

In one or more embodiments, S236 may function to collect the learnings and/or outputs from one or more of the upstream layers of the slot relation extraction model. For instance, in some embodiments, embedding data, contextual semantic data, and attention data of a given utterance from a first layer, an intermediate layer, and a near-terminal layer of the slot relation extraction model may be received as input into the classification layer of the slot relation extraction model.

In a preferred embodiment, the classification layer of the slot relation extraction model comprises a softmax classifier that may function to predict relations between slots of an utterance based on inputs from one or more upstream layers of the slot relation extraction model. In one or more embodiments, the machine learning-based dialogue system implementing the method 200 may include a plurality of distinct categories of relation. In such embodiments, a probability output or the like after an application of a softmax classifier may be mapped to one of the plurality of distinct categories of relation.

Accordingly, an output of a classification layer of the slot relation extraction model may include an identification of the specific semantic relations between slots in the dialogue-based utterance.

Additionally, or alternatively, the terminal and/or classification layer of the slot relation extraction model may use any suitable algorithm to implement the slot relation classification step.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A system for implementing slot-relation extraction in a task-oriented dialogue system, the system comprising:

a natural language understanding (NLU) module implemented by one or more computers of a machine learning task-oriented dialogue system, the NLU module comprising:
  (i) an intent classification sub-module comprising one or more dialogue intent classification machine learning models that predict an intent category of dialogue of a single utterance based on an input of utterance data, wherein the category of dialogue informs a selection of one or more slot-filling machine learning models;
  (ii) a slot-filling sub-module comprising the one or more slot-filling machine learning models that predict one or more slot classification labels for each of a plurality of slots within the single utterance; and
  (iii) a slot relation extraction sub-module comprising a slot relation extraction machine learning model that predicts one or more semantic relationship classifications between distinct pairings of two or more distinct slots of the single utterance based on an input of the intent category of dialogue prediction and the one or more slot classification label predictions for each of the plurality of slots within the single utterance;
wherein the NLU module identifies one or more semantic relationships between the distinct pairings of the two or more distinct slots of the single utterance based on the one or more semantic relationship classification predictions of the slot relation extraction machine learning model; and
a response generator that constructs a response to the single utterance or performs one or more actions in response to the single utterance based on the one or more semantic relationships between the distinct pairings of the two or more distinct slots of the single utterance.

2. The system according to claim 1, wherein:
the intent classification sub-module, the slot-filling sub-module, and the slot relation extraction sub-module together define an utterance processing pipeline stage of the NLU model; and
the slot filling sub-module is arranged operably downstream, within the utterance processing pipeline stage, of the intent classification sub-module and the slot-filling sub-module.

3. The system according to claim 2, wherein
the prediction of the semantic relationship between the distinct pairings of the two or more distinct slots of the single utterance is explicitly predicated on the prediction of the one or more slot classification labels for each of a plurality of slots within the single utterance from the slot-filling sub-module that is arranged upstream of the slot relation extraction module.

4. The system according to claim 1, wherein
the one or more slot-filling machine learning models comprise one or more light weight slot-filling machine learning models that predict the one or more slot classification labels that inform semantic meaning data of each of the plurality of slots of the single utterance without informing contextual meaning data of each of the plurality of slots of the single utterance.

5. The system according to claim 1, further comprising:
a training corpus module that constructs a training corpus including a plurality of distinct conversational utterance training data samples having slot-wise relation annotations and slot classification annotations, wherein the slot-wise relation annotations identify a distinct semantic relationship between each pair of slots in the plurality of distinct conversational utterance training data samples.

6. The system according to claim 1, further comprising:
a training module that trains the slot relation extraction machine learning model using the training corpus comprising the plurality of distinct conversational utterance training data samples having slot-wise relation annotations and slot classification annotations.

7. The system according to claim 1, wherein
the response generator compiles into NLU data:
  (a) the intent category of dialogue;
  (b) the one or more slot classification labels; and
  (c) the semantic relationship classification between distinct pairings of two or more distinct slots of the single utterance;
the response generator further constructs the response to the single utterance or performs the one or more actions in response to the single utterance based on the NLU data.

8. A method for implementing slot-relation extraction for a task-oriented dialogue system, the method comprising:
implementing one or more dialogue intent classification machine learning models that predict a category of dialogue of a single utterance based on an input of utterance data relating to the single utterance, wherein the category of dialogue informs a selection of one or more slot-filling machine learning models;
implementing the one or more slot-filling machine learning models that predict one or more slot classification labels for each of a plurality of slots within the utterance based on the input of the utterance data;
implementing a slot relation extraction machine learning model that predicts one or more semantic relationship classifications between two or more distinct slots of tokens of the utterance; and
generating a response to the single utterance or performing one or more actions in response to the single utterance based on the one or more semantic relationship classifications between the distinct pairings of the two or more distinct slots of the single utterance.

9. The method according to claim 8, wherein
implementing the slot relation extraction machine learning model includes:
  identifying all possible pairs of distinct slots based on the plurality of slots of the single utterance;
  for each pair of distinct slots, predicting a slot relationship; and
  annotating each of the pair of distinct slots based on the predicted slot relationship.

10. The method according to claim 8, wherein
implementing the slot relation extraction machine learning model is performed only after predictive outputs of the one or more dialogue intent classification machine learning models and the one or more slot-filling machine learning models.

11. The method according to claim 10, wherein
implementing the slot relation extraction machine learning model includes:
  (i) receiving an input of the prediction of the category of dialogue;
  (ii) receiving an input of the prediction of the one or more slot classification labels; and
  (iii) generating the prediction of the one or more slot relationship classifications for the single utterance based on the prediction of the category of dialogue and the one or more slot classification labels.

12. The method according to claim 8, further comprising:
constructing a training corpus including a plurality of distinct conversational utterance training data samples having slot-wise relation annotations and slot classification annotations, wherein the slot-wise relation annotations identify a distinct semantic relationship between each pair of slots in the plurality of distinct conversational utterance training data samples.

13. The method according to claim 12, further comprising:
training the slot relation extraction machine learning model using the training corpus comprising the plurality of distinct conversational utterance training data samples having slot-wise relation annotations and slot classification annotations.

14. The method according to claim 8, wherein
the one or more slot-filling machine learning models comprise one or more light weight slot-filling machine learning models that predict the one or more slot classification labels that inform semantic meaning data of each of the plurality of slots of the single utterance without informing contextual meaning data of each of the plurality of slots of the single utterance.

15. The method according to claim 8, further comprising:
invoking the slot relation extraction module based on the prediction of the category of dialogue, wherein the invoking includes:
referencing a mapping that maps each of a plurality of distinct categories of dialogue to one of a plurality of distinct slot relation extraction machine learning models; and
selecting the slot relation extraction machine learning model that is mapped to the predicted category of dialogue based on the referencing to the mapping.

16. The method according to claim 8, wherein
the slot relation extraction machine learning model comprises a slot relation neural network, wherein a structure of the slot relation neural network includes:
(a) an embeddings layer,
(b) one or more intermediate layers comprising Bi-LSTMs,
(c) a near-terminal layer comprising an attention layer, and
(d) a classification layer.

17. The method according to claim 16, wherein
the utterance data of the single utterance propagates sequentially along the structure of the slot relation neural network by first entering the embeddings layer and propagating through one or more intermediate layers then through the near-terminal layer, and exiting the classification layer with the one or more semantic relationship classifications.

* * * * *